ns Patent [19]
Hsieh et al.

[11] 4,017,366
[45] Apr. 12, 1977

[54] THERMOGRAPHIC PRINTING METHOD

[75] Inventors: Paul Y. Hsieh, Ridgewood, N.J.;
Eugene W. Rogall, Huntington Station, N.Y.

[73] Assignee: Ing. C. Olivetti & C., S.p.A., Ivrea (Turin), Italy

[22] Filed: Feb. 6, 1976

[21] Appl. No.: 655,795

Related U.S. Application Data

[63] Continuation of Ser. No. 454,653, March 25, 1974, which is a continuation of Ser. No. 323,583, Jan. 15, 1973, abandoned, which is a continuation of Ser. No. 64,395, Aug. 17, 1970, abandoned.

[52] U.S. Cl. ............................ 204/2; 101/470; 346/165; 346/76 R
[51] Int. Cl.² .................. G01D 15/06; G01D 15/10
[58] Field of Search ............... 346/74 E, 76 R, 135; 204/2; 101/470

[56] References Cited
UNITED STATES PATENTS

| | | | |
|---|---|---|---|
| 56,988 | 8/1866 | Park | 204/2 |
| 706,743 | 8/1902 | Fessenden | 204/2 |
| 2,181,533 | 11/1939 | Kline et al. | 204/2 |
| 2,316,340 | 4/1943 | Kohn | 204/2 |
| 2,786,807 | 3/1957 | Schwartz | 204/2 |
| 3,113,910 | 12/1963 | Hepher | 204/2 |
| 3,158,506 | 11/1964 | Ellison | 346/76 R |
| 3,623,122 | 11/1971 | Fotland | 346/74 E |

*Primary Examiner*—Clyde I. Coughenour
*Attorney, Agent, or Firm*—I. J. Schaefer

[57] ABSTRACT

A method of printing on thermographic paper according to which the heat for causing the imaging color change in the thermographic coating is generated by means of current in a portion of the coating dampened by a thin film of a conductive salt solution which is dispensed on the thermographic coating. The current is generated by a printing head having spaced electrodes in contact with the dampened portion of the coating. The conductive salt solution may be deposited on the thermographic coating in liquid film form, combined with a thermographic material to form a conductive coating for printing in the dry state, or mixed with the thermographic material in liquid form and dispensed on plain paper in a thin film in the path of the writing head.

2 Claims, 4 Drawing Figures

U.S. Patent
April 12, 1977
4,017,366
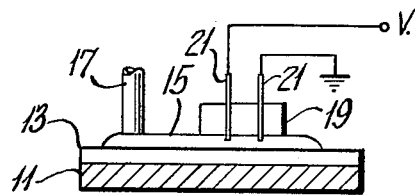
Fig.1.
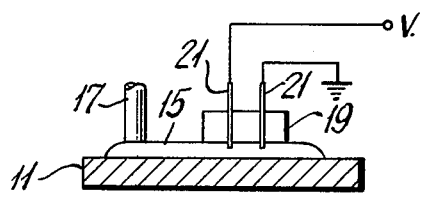
Fig.2.
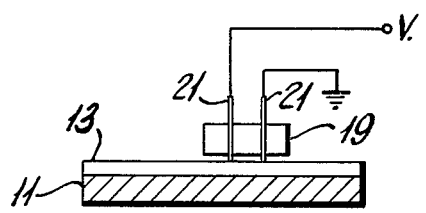
Fig.3.
Fig.4.
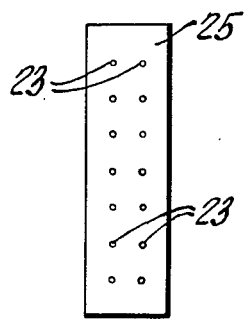
INVENTORS
PAUL Y. HSIEH
EUGENE W. ROGALL
BY
ATTORNEY

THERMOGRAPHIC PRINTING METHOD This is a continuation of application Ser. No. 454,653 filed Mar. 25, 1974 which is a continuation of application Ser. No. 323,583 filed Jan. 15, 1973 and now abandoned which is a continuation of application Ser. No. 64,395 filed Aug. 17, 1970 and now abandoned.

BACKGROUND OF THE INVENTION

This invention relates to methods of printing on thermographic paper.

Several different methods have been developed for the impactless printing of information on paper sheets or webs. In the well-known electrographic method, an electrostatic charged latent image is deposited on a dielectric paper and then developed by a liquid or solid toner. The toner may then, if necessary, be fused to the paper by heat or vapor.

In teledeltos printing a special paper is used which has a surface of a first color, usually white or light grey, and an undercoating of a contrasting color. The printing is accomplished by burning off portions of the surface of the paper in image configuration to expose the contrasting colored sublayer. This is usually accomplished by applying a voltage across the paper high enough to cause dielectric breakdown and therefore conduction in the surface layer.

U.S. Pat. No. 3,255,039 to H. R. Dalton describes an essentially similar method which uses a paper having an opaque porous coating over a contrasting color backing. A stylus having voltage applied thereto is used to selectively fuse the coating in the image area for making it transparent so that the undercoating becomes visible.

In practice all of these methods have substantial disadvantages which have prevented their widespread use in many applications. In electrographic printing, both the dielectric paper and the toner are relatively expensive and in teledeltos printing, the paper is both quite expensive and gives unsatisfactory image quality. In both of these methods extremely high voltages on the order of 1,000 volts are required for imaging the paper, which fact has further restricted their use.

Another system of impactless printing which has been considered recently is that of electrolytic printing. According to this method, the electrolysis of an electrolyte solution is used to form color. For example, a starch iodine reaction may be used in which potassium iodide is electrolyzed to obtain iodine which reacts with starch particles suspended in the electrolyte to form color. This system is attractive because starch and potassium iodide are inexpensive and because the printing may be performed on ordinary paper. However, a severe problem exists in that the image produced is not permanent and fades.

Attempts have been made to solve the fading problem by using more stable fade-resistant dyes or organic chemicals. A problem with this approach is that most organic materials are not very soluble in water and do not ionize easily. Even if the molecule has a high charge, the ionic mobility of a large molecule under the influence of an electric field is not as fast as that of an inorganic ion like iodine, and consequently a high printing speed may not be achieved.

Another common drawback with electrolytic printing is the short circuiting of electrodes due to either electrolytic deposition of metal on the electrodes or the formation of a salt bridge between electrodes.

In recent years there has been developed an impactless method of printing which alleviates many of these difficulties. According to this method, a special paper which develops color when heated to a temperature in the range of 70° to 120° centrigrade is used in conjunction with a heated writing stylus. The heating of the stylus is achieved by passing an electric current (normally a pulse) through a heating element at the stylus tip. U.S. Pat. No. 3,158,506 and 3,451,338 describe systems of this type.

Although the systems do not require high voltages and use a paper which is less expensive than that required in previous systems, they have not received as wide a use as they might. This is largely because of the fact that the stylus tip must go through a heating and cooling cycle for each dot or character printed, and thus the writing speed is limited to about 30 characters a second.

OBJECTS AND SUMMARY OF THE INVENTION

It is therefore an object of this invention to provide an improved method of impactless printing.

It is another object of the invention to increase the speed of thermographic printing systems.

In accordance with these and other objects of the invention, the heat for causing the imaging color change in the thermographic material is generated by the use of a printing head having spaced electrodes which pass current through a portion of the thermographic coating which is rendered more conductive by being dampened by a film of a conductive salt solution. The conductive salt solution may be deposited on the thermographic coating in liquid form, combined with the thermographic materials to form a conductive thermographic coating for printing in the dry state, or mixed with the thermographic materials in liquid form and dispensed on plain paper in the path of the writing head.

BRIEF DESCRIPTION OF THE DRAWINGS

FIG. 1 shows a printing system according to a first embodiment of the invention.

FIG. 2 shows a printing system according to a second embodiment of the invention, and FIG. 3 shows a printing system according to a third embodiment of the invention.

FIG. 4 shows the bottom face of a printing head.

DETAILED DESCRIPTION

The invention can best be understood by referring to the following detailed description of the illustrated embodiments.

Referring now to FIG. 1 of the drawings, there is shown a printing system according to one embodiment of the invention according to which the base paper 11 is coated with a thermographic material 13. In order to image the thermographic coating 13 by the method of the invention, the coating 13 is first dampened with a conductive salt solution 15, for instance by means of a dispenser 17. Writing head 19 which has two spaced electrodes 21 is moved along the surface of the thermographic coating 13 following in the path of the dispenser 17 with the ends of the electrodes 21 in light contact with the portion of the coating 13 dampened by the conductive salt solution 15.

The heat required for the color forming thermochemical reaction in the thermographic coating 13 is generated by passing a current through a portion of the salt solution 15 bridging the two electrodes 21. The energy requirement for the process is less than one milliwatt-sec per dot printed. A voltage V equal to 50 volts across the electrodes 21 which may be spaced by 2 mils generates a current of about 20 milliamps and is sufficient to cause printing in a fraction of a millisecond.

Unlike the electrolytic process which uses charge ($Q = I \times T$ where $I$ = current and $T$ = time), the present printing process depends on the heat generated by the passage of a current ($I^2R \times T$ where $R$ = resistance). Since the magnitude and duration of the current in the solution determine the amount of heat produced, the electrode spacing, conductivity of solution, applied voltage, and the duration of voltage application are variables. Various combinations are possible and a proper one may be selected for a particular application to obtain the desirable printing characteristics.

The particular type of base paper sheet 11 is not at all critical. Heat developable coatings have been produced on onionskin paper, bond paper, electrographic paper and electrofax base paper. Various materials may be used for the thermographic coating and suitable examples are described in U.S. Pat. No. 3,451,338 to H. H. Baum and in British Pat. No. 953,150 which was published on Mar. 25, 1964. The paper manufactured by the 3M Company and sold under the trademark "Thermofax" may also be used. However, the printing speed, i.e., efficiency, depends upon the thermographic materials. A faster speed can be obtained from the thermographic materials which require less energy input to trigger the color forming reaction and thus change color at a lower temperature.

The dispenser for the conductive salt solution may be similar to that described in U.S. patent application Ser. No. 28,565 which was filed on Apr. 15, 1970. It is, of course, also possible to wet the thermographic coating 13 with the conductive solution 15 by other methods and the dispenser 17 is shown only as an illustration of a relatively simple method. The conductive salt solution 15 may, for instance, be an aqueous solution of salt of an alkaline metal or alkaline earth metal such as $CaCl_2$, KI, KCl, KBr, $KNO_3$; NaCl, NaI, NaBr, or $Na_2SO_4$. Since the conductivity of the solution is instrumental in the method and usually increases with the concentration, a higher concentration gives a faster printing speed. A salt at a proper concentration may be selected for a specific application. When 50 VDC is applied to a pair of electrodes spaced at two mils, good dots have been obtained in as little as 200 microseconds, when using a 10% KBr solution to dampen the coating 13, and in 250 microseconds, when using a 20% NaCl solution to dampen the coating 13.

The electrode wires 21 of printing head 19 may be spaced by a distance of two mils and during the printing the electrodes 21 may be placed in light contact with the paper surface. The electrode wires 21 may be made of a platinum iridium alloy. Tungsten carbide, chrome, nickel, or iron wires can also be used. The distance between electrodes may be increased if a larger dot is to be printed.

The heat for causing the change in color in the thermographic coating 13 is generated by the $I^2R$ heating of the conductive salt solution between the electrodes 21. Since the salt used for the heat generation is an electrolyte, it is possible that electrolysis may also contribute in a minor way to the printing process, especially if the electrolytic products react with thermographic materials to form color. Since the electrodes 21 themselves are not heated during the printing operation, the printing speed is not limited by the necessity of a cooling cycle for the printing head and therefore can be quite fast.

It is not necessary to soak the coating 13 with the conductive salt solution 15. It is necessary only to dampen the coating 13 with the conductive solution 15 enough to raise the conductivity of the dampened portion sufficiently to allow the printing. It has been found that after printing the paper appears substantially dry to the touch.

According to a second embodiment of the invention as shown in FIG. 2 of the drawings, the method of the invention may be used to print on plain paper. According to this embodiment, the dispenser 17 dispenses a mixture 15 of the thermographic chemical and a conductive agent such as salt in water on the surface of the paper 11. The styli 21 of printing head 19 are then brought into contact with the wetted portion of the paper 11 and print in the same manner described above for the embodiment of FIG. 1.

The thermographic material used in the solution 15 of FIG. 2 may be similar to that described in the above-mentioned British Pat. No. 953,150 or the U.S. Pat. No. 3,451,338. A salt or conductive polymer of some type are added to the solution to increase its conductivity. A conductive formulation which was found to be effective is as follows:

| | | |
|---|---|---|
| Composition 1 | | |
| Calcium resinate | (5.23% Ca) | 44 g |
| Cobalt naphthenate | (6 % Co) | 8 g |
| Polyvinyl alcohol - 88% hydrolyzed and having a viscosity of 35–45 centipoises in a 4% water solution at 20 degrees centigrade as determined by the Hoeppler falling ball method - in a 7% aqueous solution | | 143 g |
| Non-ionic surface active agent of the ditertiary acetylenic glycol type having a melting point of 37 and a boiling point of 260 degrees centigrade (manufactured by Air Reduction Co., New York, N.Y. under the trade mark "Surfynol 104") | | .3 g |
| Calgon Conductive Polymer 261 | | 50 g |
| Water | | 100 g |
| Composition 2 | | |
| 1,3,3-trimethyl-6'-chloro-8'-methoxy indolino benzospiropyran (or 1,3,3-trimethyl-8'-methoxy indolino benzospiropyran) | | 33 g |
| Polyvinyl alcohol (as in Composition 1) | | 78 g |
| Surfynol 104 (as in Composition 1) | | .15 g |
| Water | | 80 g |

Compositions 1 and 2 are ground separately in ball mills to obtain suspensions with particle size below 3 microns before the two compositions are mixed together for being dispensed onto the paper 11.

Fifty grams of NaCl may be substituted for the 50 grams of the Calgon conductive polymer in Composition 1. In this case, polyvinyl alcohol may be replaced with a binder which is compatible with the salt. Hydroxy ethyl cellulose and sodium carboxy methyl cellulose were found to be useful.

The water content of the composition may be varied as desired to meet the flow demands of the dispenser 17.

It is also possible to include the salt or the conductive polymer with the thermographic material in the coating 13 as is illustrated in FIG. 3 of the drawings. In this case the need for dispensing the salt solution or the thermographic material and salt solution on the paper 11 to be imaged is obviated, and the conduction between the electrodes 21 of the printing head 19 takes place through the thermographic coating 13.

The compositions discussed above in relation to the embodiment of FIG. 2 are also suitable for use as the conductive thermographic coating of FIG. 3. In this case the solution is applied by normal coating methods, for instance by a draw-down or by other standard methods. When salt, which is the preferable material, is used in place of the Calgon conductive polymer, a humectant such as glycerine must be incorporated to suppress the crystallization of the salt and to provide moisture content in the coatings. The amount of glycerine added should be about 40% by weight of the salt. Therefore when 50 gms of salt is used, 20 gms of glycerine is incorporated. It is also necessary to use a binder which is compatible with the salt; otherwise the binder may precipitate out of the solution during the coating operation.

Since the coating is in a dry state and is less conductive than a salt solution, a higher voltage is preferable for the printing operation. Good results were obtained by applying 220–320 VDC for about 100 microseconds to two electrodes 21 which were in contact with the thermographic coating 13.

An additional advantage of the printing method of the invention is that there is no corrosion or scale formation on the electrodes. Also, the printing electrodes can remain on the paper surface without affecting the print resolution.

Good results have been achieved with all three of the above-described embodiments.

In commercial machines thermographic printing is usually performed in a manner similar to electrographic printing where characters are formed by printing selected dots of a 5 × 7 dot matrix. In printing characters of this type using the methods of the present invention it is possible to use a print head such as is illustrated in FIG. 4 of the drawings. In this print head, the bottom face of which is illustrated in FIG. 4, seven pairs of electrodes 23 are arranged in a line and encased in a rigid supporting material 25 which may, for instance, be made out of ceramic or a plastic such as teflon. The ends of the electrodes 23 may be flush with the surface of the supporting material 25. Electrodes 23 of each pair may be spaced by a distance of 2 mils and each pair of electrodes may be spaced by a distance of 5 mils from the adjacent pairs.

Printing is accomplished with a print head of this type by drawing the head across the surface of the paper or other substrate to be printed on, either behind the dispenser 17 in the case of the embodiments of the invention illustrated in FIGS. 1 and 2 of the drawings, or across any selected portion of the surface of the thermographic coating in the embodiment illustrated in FIG. 3 of the drawings. The electrodes 23 are selectively pulsed by a voltage source for printing the proper dots in the 5 × 7 matrix form.

It is also possible to use a line of pairs of electrodes across the entire width of the paper in order to print the characters a full line at a time.

A more complete description of a print head similar to that illustrated in FIG. 4 of the drawings which may be used to print according to the method of the invention is described in the aforementioned U.S. patent application Ser. No. 28,565 filed on Apr. 15, 1970.

What we claim is:

1. A method of producing visible printing on an electrically insulating receiving medium comprising the steps of:

applying to a selected portion of said receiving medium a non-conductive heat sensitive material in the liquid state and of the type that changes its color when heated over a threshold temperature in mixture with a liquid electrolyte chemically non-reactable with said heat sensitive material;

contacting said selected portion of said applied mixture with a pair of closely spaced electrodes made of material electrolytically non-corrodable by said liquid electrolyte, and applying an electrical potential difference across said electrodes for causing a current to flow therebetween and through said applied mixture to heat a selected portion of said applied mixture to a temperature higher than said threshold temperature to effect the associated heat sensitive material to change color.

2. The method of claim 1 wherein said mixture comprises: an indolinobenzo-spiropyran compound, a calcium resinate, a cobalto naphthenate, a polyvinyl alcohol, a non ionic surface active agent and a conductive polymer in water.

* * * * *